(12) United States Patent
Jalkanen

(10) Patent No.: US 8,490,881 B2
(45) Date of Patent: Jul. 23, 2013

(54) APPARATUSES AND METHODS RELATING TO RADIO FREQUENCY IDENTIFICATION (RFID) TAGS

(75) Inventor: Janne Paavo Ristoppi Jalkanen, Espoo (FI)

(73) Assignee: Nokia Corporation, Espoo (FI)

( * ) Notice: Subject to any disclaimer, the term of this patent is extended or adjusted under 35 U.S.C. 154(b) by 139 days.

(21) Appl. No.: 12/995,985

(22) PCT Filed: Jun. 9, 2008

(86) PCT No.: PCT/EP2008/057183
§ 371 (c)(1),
(2), (4) Date: Feb. 16, 2011

(87) PCT Pub. No.: WO2009/149746
PCT Pub. Date: Dec. 17, 2009

(65) Prior Publication Data
US 2011/0139881 A1  Jun. 16, 2011

(51) Int. Cl.
*G06K 19/06* (2006.01)
(52) U.S. Cl.
USPC .................................................. 235/492
(58) Field of Classification Search
USPC .................................................. 235/492
See application file for complete search history.

(56) References Cited

U.S. PATENT DOCUMENTS

| 7,237,719 B2 * | 7/2007 | Fruhauf .................. 235/451 |
| 2005/0189425 A1 | 9/2005 | Itou |
| 2007/0069909 A1 | 3/2007 | Pavlovic et al. |
| 2008/0006696 A1 * | 1/2008 | Piersol et al. ............. 235/451 |

FOREIGN PATENT DOCUMENTS

| DE | 102005028407 | 1/2007 |
| EP | 1439487 | 7/2004 |
| JP | 2006053761 | 2/2006 |
| WO | WO0184492 | 11/2001 |
| WO | WO2004055749 | 7/2004 |
| WO | WO2006134807 | 12/2006 |

OTHER PUBLICATIONS

International Search Report of PCT/EP2008/057183—Date of Completion of Search: Feb. 4, 2009.
"Clipped Tag" entry from Wikipedia, downloaded May 22, 2008, 3 pages.

* cited by examiner

*Primary Examiner* — Seung Lee
(74) *Attorney, Agent, or Firm* — Locke Lord LLP

(57) ABSTRACT

An apparatus comprising: an assembly of components; a battery that is not part of the assembly of components and is configured for assembly by a user of the apparatus with the assembly of components; and a radio frequency identification tag arranged to have operational characteristics automatically dependent upon whether the battery is assembled with the assembly of components, wherein the apparatus has a first configuration in which the battery is not assembled with the assembly of components and the radio frequency identification tag is fully operational and the apparatus has a second configuration in which the battery is assembled with the assembly of components and the radio frequency identification tag is not fully operational.

22 Claims, 3 Drawing Sheets

APPARATUSES AND METHODS RELATING TO RADIO FREQUENCY IDENTIFICATION (RFID) TAGS

FIELD OF THE INVENTION

Embodiments of the present invention relate to apparatuses and methods relating to radio frequency identification (RFID) tags.

BACKGROUND TO THE INVENTION

A radio frequency identification (RFID) tag is a radio frequency transponder that automatically responds to receipt of a radio frequency inquiry signal with a radio frequency response signal that identifies the RFID tag.

An RFID tag may be permanently assembled into an apparatus at manufacture to enable identification of the apparatus and enable tracking of the apparatus as it is manufactured, distributed and sold.

BRIEF DESCRIPTION OF VARIOUS EMBODIMENTS OF THE INVENTION

According to various, but not necessarily all, embodiments of the invention there is provided an apparatus comprising: an assembly of components; an additional component that is not part of the assembly of components and is configured for assembly by a user of the apparatus with the assembly of components; and a radio frequency identification tag arranged to have operational characteristics that are automatically dependent upon whether the additional component is assembled as a part of the assembly of components, wherein the apparatus has a first configuration in which the additional component is not part of the assembly of components, the apparatus is unusable by the user and the radio frequency identification tag has first operational characteristics and the apparatus has a second configuration in which the additional component is assembled as a part of the assembly of components, the apparatus is usable by the user and the radio frequency identification tag has second operational characteristics.

The assembly of components may, for example, be created at a factory and the additional component may be bundled with the assembly of components in a package for distribution or sale or sold separately. At or after the point of sale, the additional component is assembled with the assembly of components to create a working apparatus. Thus a physical component that is necessary to create a working apparatus is used to alter the characteristics of the radio frequency identification tag.

The first operational characteristics enable radio frequency identification of the apparatus via the radio frequency identification tag by a reader at a first distance and the second operational characteristics disable radio frequency identification of the apparatus via the radio frequency identification tag by the reader at the first distance.

The modification of the characteristics of the radio frequency identification tag on assembling the apparatus may reduce the performance of the identification tag. This protects the privacy of a user.

The additional component may be attachable and detachable from the assembly of components. Detachment of the additional component from the assembly of components may improve the performance of the radio frequency identification tag. It may, for example, restore the first operational characteristics.

The additional component may be a battery or another component that is assembled with the assembly of components to create a working apparatus. It could, for example, be a portion of a housing of the apparatus such as an attachable and detachable cover. It could, for example, be a module such as a smart card, subscriber identity module, user identity module, or memory card.

According to various, but not necessarily all, embodiments of the invention there is provided an apparatus comprising: an assembly of components; a battery that is not part of the assembly of components and is configured for assembly by a user of the apparatus with the assembly of components; and a radio frequency identification tag arranged to have operational characteristics automatically dependent upon whether the battery is assembled with the assembly of components, wherein the apparatus has a first configuration in which the battery is not assembled with the assembly of components and the radio frequency identification tag is fully operational and the apparatus has a second configuration in which the battery is assembled with the assembly of components and the radio frequency identification tag is not fully operational.

The assembly of components may, for example, be created at a factory and the battery may be bundled with the assembly of components in a package for distribution or sale or sold separately. Before the user uses the apparatus, for example, at or after the point of sale, the battery must be assembled with the assembly of components to create a working apparatus, such as, for example, a mobile functional electronic device. Thus a physical component that is necessary to create a working apparatus may be used to vary the performance of the radio frequency identification tag.

The battery may be attachable and detachable from the assembly of components. The detachment of the battery from the assembly of components improves the operation of the radio frequency identification tag. It may, for example, restore the first operational characteristics.

When the radio frequency tag is fully operational radio frequency identification of the apparatus via the radio frequency identification tag by a reader at a first distance is enabled and when the radio frequency tag is not fully operational radio frequency identification of the apparatus via the radio frequency identification tag by a reader at a first distance is disabled.

The modification of the characteristics of the radio frequency identification tag on assembling the apparatus may reduce the performance of the identification tag. This protects the privacy of a user.

The battery may be configured so that when it is assembled as a part of the assembly of components, it interferes with the reception of radio frequency signals by the radio frequency identification tag.

The battery may comprise electrically conductive material and may be configured such that the electrically conductive material is in close physical proximity to the radio frequency identification tag when the battery is assembled as a part of the assembly of components.

The radio frequency identification tag may be positioned between the electrically conductive material of the battery and an electrically conductive element when the battery is assembled as a part of the assembly of components.

The apparatus may comprise a switch that is actuated by the assembly of the battery with the assembly of components and which modifies the radio frequency identification tag.

The switch may be a physical switch which moves to modify the radio frequency identification tag.

The switch may be an electrical switch, actuated by the battery, that modifies the radio frequency identification tag.

The switch may be an integral part of the radio frequency identification tag

According to various, but not necessarily all, embodiments of the invention there is provided a method comprising: providing an assembly of components comprising a radio frequency identification tag; providing a battery that is not part of the assembly of components and is configured for assembly by a user of the apparatus with the assembly of components; and providing for assembly of the battery with the assembly of components and the consequent disablement of the radio frequency identification tag.

The method may also comprise providing for disassembly of the battery from the assembly of components and the consequent enablement of the radio frequency identification tag.

According to various, but not necessarily all, embodiments of the invention there is provided a method comprising: disabling a radio frequency identification tag by assembling a battery with an assembly of components comprising the radio frequency identification tag.

According to various, but not necessarily all, embodiments of the invention there is provided a method comprising: enabling a radio frequency identification tag by disassembling a battery from an assembly of components comprising the radio frequency identification tag.

According to various, but not necessarily all, embodiments of the invention there is provided an apparatus comprising: an assembly of components; a radio frequency identification tag; and a switch configured to reduce the performance of the radio frequency identification tag automatically when a battery is assembled with the assembly of components.

According to various, but not necessarily all, embodiments of the invention there is provided an apparatus comprising: an assembly of components including a housing; a battery bay for receiving a battery; and a radio frequency identification tag positioned within the battery bay and adjacent a conductive element, such that when a battery is present in the battery bay, the radio frequency identification tag is positioned between the battery and the conductive element.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1A:
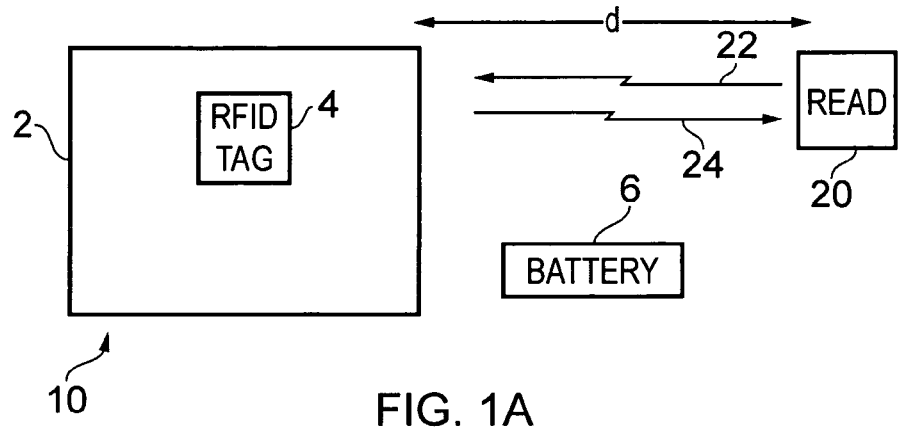
FIG. 1A schematically illustrates an apparatus in a first configuration in which an additional component is not part of an assembly of components.
Figure 1B:
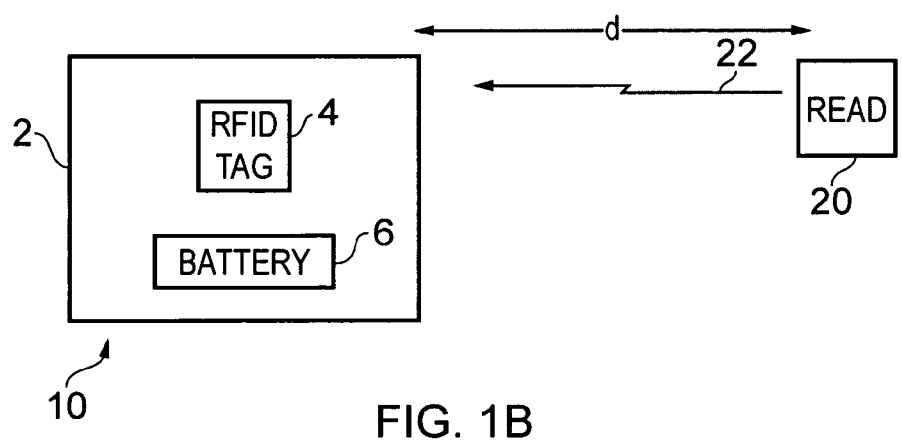
FIG. 1B schematically illustrates the apparatus in a second configuration in which the additional component is assembled as part of the assembly of components.

FIG. 1A schematically illustrates an apparatus 10 in a first configuration in which an additional component 6 is not part of an assembly 2 of components. FIG. 1B schematically illustrates the apparatus 10 in a second configuration in which the additional component 6 is assembled as part of the assembly 2 of components.

The assembly 2 of components comprises a radio frequency identification (RFID) tag 4. An RFID tag 4 is a radio frequency transponder that automatically responds to receipt of a radio frequency inquiry signal 22 with a radio frequency response signal 24. An RFID tag 4 is typically permanently assembled into the apparatus 10 at manufacture and may be used to identify and track the apparatus 10.

The RFID tag 4 may be passive or active. A passive tag does not have its own battery but uses the energy of the received inquiry signal 22 to power the response signal 24. Examples of passive RFID tags are defined by, for example, the standards ISO 14443, Electronic Product Code (EPC) and ISO 18000-6. An active RFID tag has its own long-life battery.

The range of an RFID tag 4 is dependent upon the power output of a reader device 20 that produces the inquiry signal 22 and the type of RFID tag 4. The power of the reader 20 may be limited by law, for example, to 1 W. Passive RFID tags have a range of a few cms to tens of meters although work is on-going to extend this range. Active RFID tags can have a greater range. When tags operating at higher frequencies are used the range can be increased.

The apparatus 10 may be an electronic device that is mobile (moves with a person) or portable (carried by a person) and that is personal (used exclusively or predominantly by an individual). The identification or tracking of an apparatus 10 that is personal and mobile/portable would enable the tracking of an individual.

The RFID tag 4 is arranged to have operational characteristics that are automatically dependent upon whether the additional component 6 is assembled as a part of the assembly 2 of components. The modification of the characteristics of the RFID tag 4 may disable third party tracking of the apparatus 10 while it is in the possession of an individual user. This protects the privacy of a user.

The additional component 6 is a 'precursor' component. A precursor component is a component that is assembled with the assembly 2 of components before the apparatus 10 is usable. It is typically a functional component that provides a necessary function to the apparatus 10 in addition to modifying the operational characteristics of the RFID tag 4. In the illustrated examples the additional component 6 is a battery that provides power to the apparatus 10. However, in other embodiments, the additional component 6 may be another precursor component that is assembled with the assembly 2 of components to create a working apparatus 10. It could, for example, be a necessary portion of a housing of the apparatus such as an attachable and detachable cover. It could, for example, be a necessary additional electronic peripheral component such as a smart card, subscriber identity module, user identity module, or memory card.

Referring to FIG. 1A, the apparatus 10 is in a first configuration in which the additional component 6 is not part of the assembly 2 of components. The apparatus 10 is unusable by the user and the radio frequency identification tag 4 has first operational characteristics. The first operational characteristics enable the RFID tag 4 to receive a radio frequency inquiry signal 22 from a reader device 20 at a distance d and automatically respond with a radio frequency response signal 24 that includes reply data. The reply data may identify the RFID tag 4. It may for example be a Unique ID number (UID) that is returned in the first reply to an interrogation from a reader. The RFID tag 4 may also include a memory and the reply data may be read from the memory and include one or more of production serial numbers, International mobile equipment identifier (IMEI) if the apparatus 10 is a mobile communication device, and other production and service data such as version, batch, date, time or anything else which helps later servicing. The data may be in plain text or encrypted, or simply as a sequence that is only meaningful to the apparatus manufacturer such as line number, batch, shipping number etc.

The RFID tag 4 is arranged to have operational characteristics that are automatically dependent upon whether the additional component 6 is assembled as a part of the assembly 2 of components. The modification of the characteristics of the RFID tag 4 may reduce the performance of the RFID tag 4. This protects the privacy of a user.

Referring to FIG. 1B, the apparatus 10 is in the second configuration in which the additional component 6 is part of the assembly 2 of components. The apparatus 10 is usable by the user and the RFID tag 4 has second operational characteristics. In this example, the second operational characteristics disable the RFID tag 4 from responding to a radio frequency inquiry signal 22 sent from the reader device 20 at the distance d.

Figure 2:
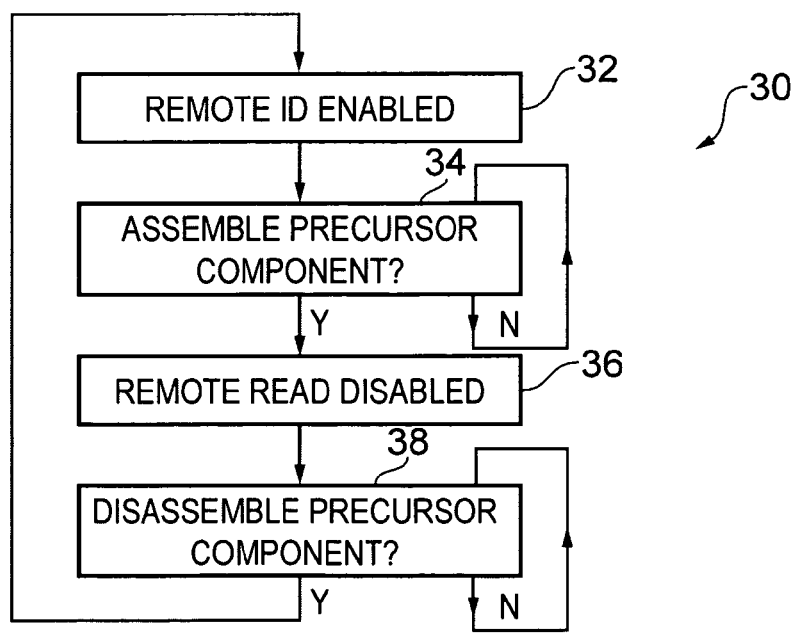
FIG. 2 schematically illustrates one method for controlling the operational characteristics of the RFID tag by assembling and disassembling an attachable/detachable precursor component.

FIG. 2 schematically illustrates one method 30 for controlling the operational characteristics of the RFID tag 4 by assembling and disassembling an attachable/detachable precursor component 6.

Initially at step 32, the additional precursor component 6 (e.g. the battery) is separate from the apparatus 10 and the apparatus 10 is in the first configuration (FIG. 1A). Remote identification (and tracking) of the apparatus 10 is enabled.

When at step 34 the precursor component 6 is assembled with the assembly 2 of components to enable an individual user to use the apparatus 10, the apparatus 10 changes from the first configuration (FIG. 1A) to the second configuration (FIG. 1B) and, in this example, remote identification (and tracking) of the apparatus 10 is disabled at step 36.

When at step 38 the precursor component 6 is disassembled from the assembly 2 of components, the apparatus 10 changes from the second configuration (FIG. 1B) to the first configuration (FIG. 1A) and, in this example, remote identification (and tracking) of the apparatus 10 is re-enabled at step 32.

Figure 3:
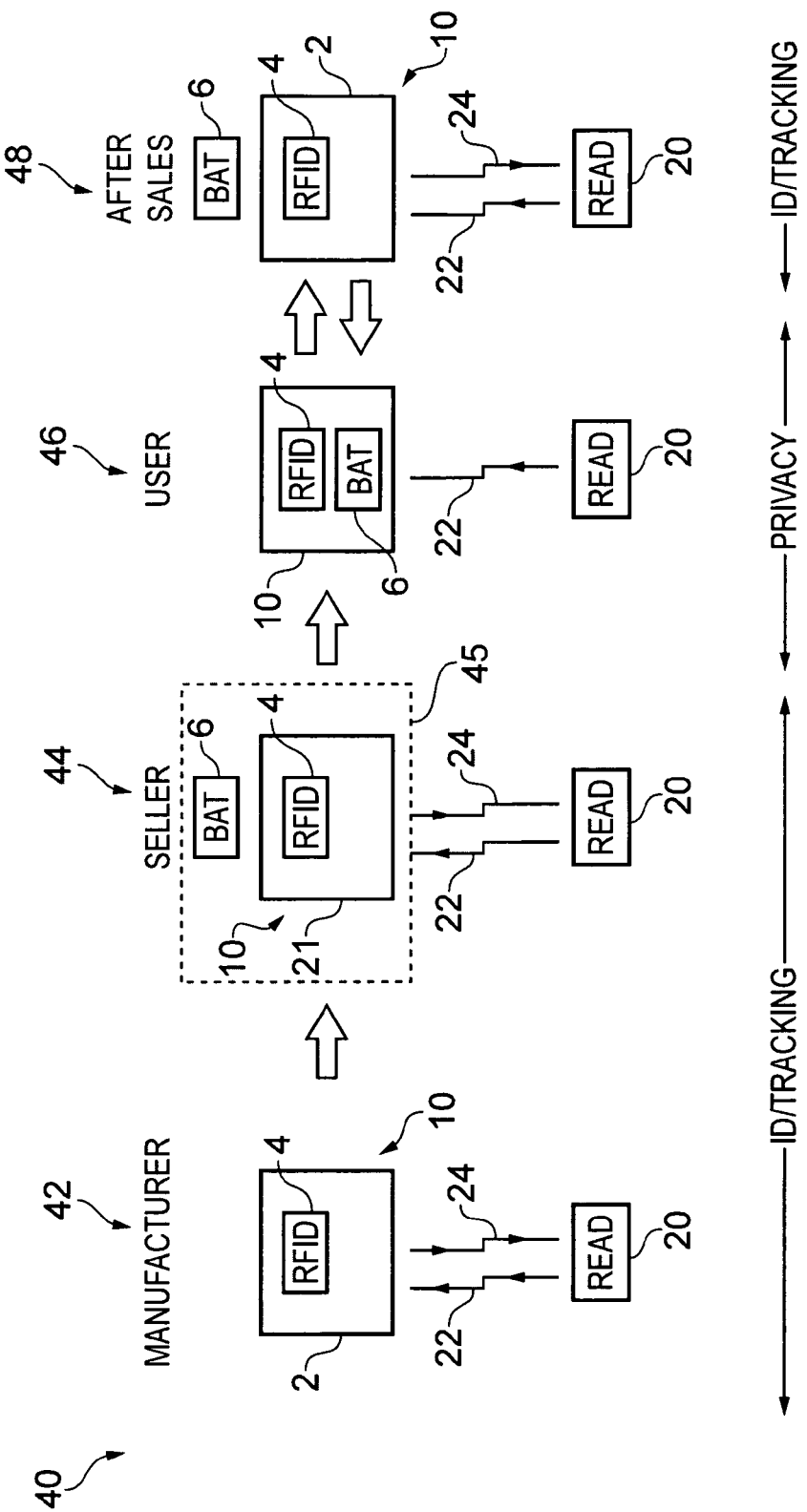
FIG. 3 illustrates how during a life cycle of an apparatus the identification/tracking of the apparatus may be switched on and off by attaching and detaching a battery.

FIG. 3 illustrates how during a life cycle of an apparatus 10 the identification/tracking of the apparatus may be switched on and off by attaching and detaching a battery 6. Attaching the battery 6 disables the RFID tag 4 and detaching the battery re-enables the RFID tag 4.

At stage 42, a manufacturer creates an apparatus 10 by assembling components including the RFID tag 4 into a permanent assembly 2 of components. Permanent in this sense means that a user should not and typically cannot without special tools disassemble the permanent assembly 2 of components. At this stage the apparatus 10 is in the first configuration (FIG. 1A) and the RFID tag 4 has the first operational characteristics. Identification and tracking of the apparatus 10 is enabled.

At stage 44, a distributor or seller bundles the apparatus 10 with the additional precursor component 6 which in this example is a battery. Typically a package 45 will include the apparatus 10 and the battery 6. At this stage the apparatus 10 is in the first configuration (FIG. 1A) and identification and tracking of the apparatus 10 (and package 45) is enabled.

The distributor or seller provides to a user the apparatus 10, the battery and instructions or guidance for assembly of the battery 6 with the permanent assembly 2 of components so that it is part of the apparatus 10 and also for disassembly of the battery 6 from the assembly of components 2 so that it is not part of the apparatus.

At stage 46, a user or an operator at the point of sale assembles the battery 6 with the permanent assembly 2 to create a temporary assembly of components. This converts the apparatus 10 from the first configuration to the second configuration. The apparatus 10 in the first configuration is not usable by a user but the apparatus in the second configuration is usable by a user. Temporary in this sense means that a user should and typically can without special tools disassemble the battery 6 from the assembly. When the apparatus 10 is in the second configuration (FIG. 1B) the RFID tag 4 has the second operational characteristics. Identification and tracking of the apparatus 10 by a third party are disabled. The privacy of the user is therefore protected.

At stage 48, an after sales technician disassembles the battery 6 from the apparatus 10 to convert the apparatus from the second configuration to the first configuration. In the first configuration (FIG. 1A) the RFID tag 4 has the first operational characteristics. Identification and tracking of the apparatus 10 are re-enabled. The technician can therefore easily identify characteristics of the apparatus by accessing the tag content or a database using an identifier received from the RFID tag 4.

The after sales technician may return the apparatus 10 to the user 46 who assembles the battery 6 with the permanent assembly 2 to create a temporary assembly of components. This converts the apparatus 10 from the first configuration to the second configuration. In the second configuration (FIG. 1B) the RFID tag 4 has the second operational characteristics. Identification and tracking of the apparatus 10 by a third party are disabled. The privacy of the user is therefore protected.

Figure 4:
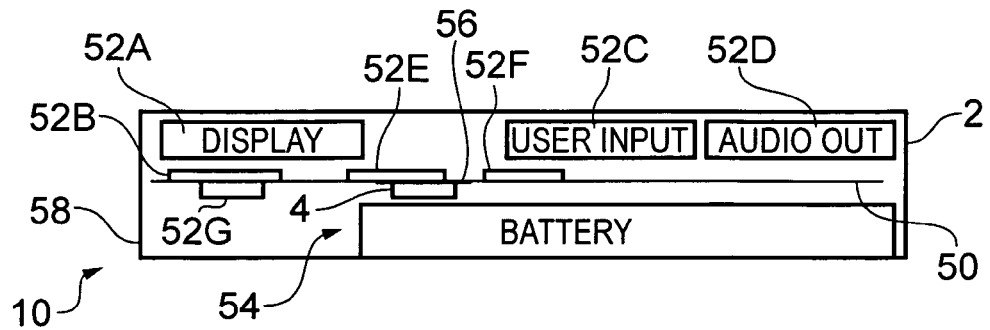
FIG. 4 schematically illustrates an apparatus in the second configuration where the battery interferes with the operation of the radio frequency identification tag.

FIG. 4 schematically illustrates an apparatus 10 in the second configuration. In this example, the permanent assembly 2 of components comprises a printed wiring board (PWB) 50 carrying the RFID tag 4 and further functional components 52A, 52B . . . . The further functional components, in this example, include a display 52A, display driver circuitry 52B, user input device 52C, audio output device 52D, processing circuitry 52E, memory circuitry 52F and, in this example, cellular transceiver circuitry 52G.

The RFID tag 4 is positioned within a battery compartment or bay 54 in a housing 58, whereas the cellular transceiver circuitry 52G is positioned remotely from the battery bay 54.

The RFID tag 4 may optionally also be positioned adjacent a conductive element 56 associated with the PWB 50. The conductive element 56 may be, for example, metallization used to enable the PWB 50 to operate as a ground plane for the cellular transceiver circuitry 52F. The conductive element 56 may be useful with some but not necessarily all RFID tags. The conductive element 56 may, in particular, be useful with RFID tags that operate at certain frequencies.

A battery 6 typically comprises metal or a metal casing, when a battery 6 is positioned within the battery bay 54 the RFID tag 4 is positioned between the conductive battery 6 and the conductive element 56 and in very close physical proximity to both. The conductive battery 6 and the conductive element 56 interfere with the reception of radio frequency signals 22 by the RFID tag 4.

RFID tag 4 has first operational characteristics in the absence of a battery 6 in the battery bay 54. However, the presence of a battery 6 in the battery bay interferes with the reception of radio frequency signals 22 by the RFID tag 4 and results in the RFID tag 4 having second operational characteristics.

Figure 5:
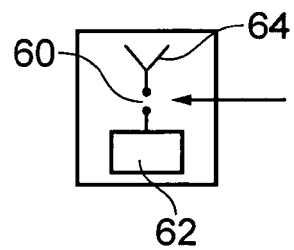
FIG. 5 schematically illustrates an example of an RFID tag where a switch modifies the RFID tag and adapts its operational characteristics.

FIG. 5 schematically illustrates an example of an RFID tag 4 which is configured to have variable operational characteristics. In this example, a switch 60 is used to modify the RFID tag 4 and adapt its operational characteristics.

In the illustrated example, the switch 60 is used to connect/disconnect RFID circuitry 62 from an antenna 64. The switch 60 is closed automatically to connect the RFID circuitry 62 and antenna 64 when the apparatus is in the first configuration and is opened automatically to disconnect the RFID circuitry 62 and antenna 64 when the apparatus is in the second configuration.

The switch 60 may be an electrical switch 70.

Figure 6:
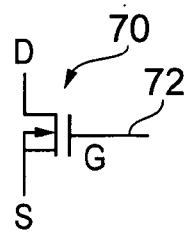
FIG. 6 illustrates an electric switch.

FIG. 6 illustrates an n-channel depletion mode field effect transistor (FET) which could be placed so that its channel is in series with the antenna 64 and RFID circuitry 62. In the quiescent state (absence of a voltage on the gate 72) the transistor is on. A positive voltage on the gate 72 of the FET 70 (provided by the battery 6 when it is present) switches the transistor off and disables the RFID tag 4. Thus the electrical switch 70 is opened by the charge of the battery. The charge of the battery may be sufficient to operate such an electrical switch even when the charge is insufficient for operation of the apparatus 10.

Figure 7:
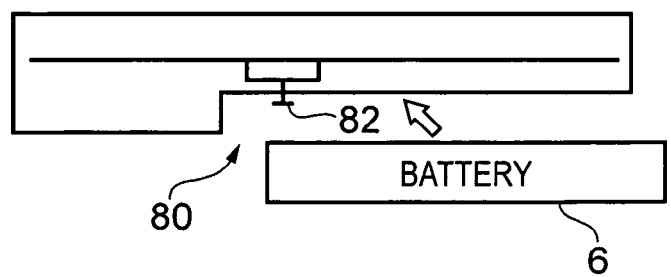
FIG. 7 illustrates a physical electric switch.

The switch 60 may be a physical switch 80 as illustrated in FIG. 7. A resiliently movable actuator 82 extends into a battery bay 54 in a housing 58 of the apparatus 10. When a battery 6 is positioned in the battery bay 54, the actuator is depressed against a bias and the switch 60 is opened. When the battery 6 is removed from the battery bay 54, the actuator returns to its equilibrium position under the bias and the switch 60 is closed.

It is of course possible to use a switch arrangement in which a physical switch and an electrical switch are positioned in series so that if either one of the electrical or physical switches is open the switching arrangement is open. This provides a fail safe mechanism so that the RFID tag 4 is disabled if one or both of the electrical switch 70 and physical switch 80 are actuated.

It is possible to provide an RFID tag 4 with a switch 60 in the embodiment illustrated in FIG. 4. The switch 60, when operative and actuated, disables the RFID tag 4 by preventing its operation. The presence of the battery 6 in the battery compartment disables the RFID tag 4 by diminishing its efficiency and reduces the range of operation of the RFID tag 4 but does not necessarily prevent its operation. This provides a fail safe mechanism that disables the RFID tag 4 even if the switch 60 is inoperative.

The blocks illustrated in FIG. 2. may represent steps in a method. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
   an assembly of components;
   a battery that is not part of the assembly of components and is configured for assembly by a user of the apparatus with the assembly of components; and
   a radio frequency identification tag configured to have operational characteristics automatically dependent upon whether the battery is assembled with the assembly of components,
   wherein:
   the apparatus has a first configuration in which the battery is not assembled with the assembly of components and the radio frequency identification tag is fully operational and the apparatus has a second configuration in which the battery is assembled with the assembly of components and the radio frequency identification tag is not fully operational;
   the battery comprises electrically conductive material and when the battery is assembled as a part of the assembly of components the radio frequency identification tag is positioned between the electrically conductive material of the battery and an electrically conductive element.

2. An apparatus as claimed in claim 1, wherein the battery is attachable and detachable from the assembly of components and wherein detachment of the battery from the assembly of components converts the operation of the radio frequency identification tag.

3. An apparatus as claimed in claim 1, wherein changing the configuration of the apparatus by assembling the battery with the assembly of components enables use of the apparatus as a mobile functioning electronic device.

4. An apparatus as claimed in claim 1, wherein when the radio frequency tag is fully operational, radio frequency identification of the apparatus via the radio frequency identification tag by a reader at a first distance is enabled and when the radio frequency tag is not fully operational, radio frequency identification of the apparatus via the radio frequency identification tag by the reader at the first distance is disabled.

5. An apparatus as claimed in claim 1, wherein the battery is configured such that the electrically conductive material is in close physical proximity to the radio frequency identification tag when the battery is assembled as a part of the assembly of components.

6. An apparatus as claimed in claim 1, wherein the radio frequency tag is mounted on a printed wiring board.

7. An apparatus as claimed in claim 1, wherein the apparatus is a mobile personal electronic device.

8. An apparatus comprising:
   an assembly of components;
   a battery that is not part of the assembly of components and is configured for assembly by a user of the apparatus with the assembly of components;
   a radio frequency identification tag configured to have operational characteristics automatically dependent upon whether the battery is assembled with the assembly of components, wherein the apparatus has a first configuration in which the battery is not assembled with the assembly of components and the radio frequency identification tag is fully operational and the apparatus has a second configuration in which the battery is assembled with the assembly of components and the radio frequency identification tag is not fully operational; and the apparatus further comprises a switch that is configured to be actuated by the assembly of the battery with the assembly of components and is configured to cause the radio identification tag to be not fully operational.

9. An apparatus as claimed in claim 8, wherein the switch is a physical switch which moves to modify the radio frequency identification tag.

10. An apparatus as claimed in claim 8, wherein the switch is an electrical switch, actuated by the battery, that modifies the radio frequency identification tag.

11. An apparatus as claimed in claim 8, wherein the switch is an integral part of the radio frequency identification tag.

12. A method comprising:
providing an assembly of components comprising a radio frequency identification tag and an electrically conductive element;
providing a battery, comprising electrically conductive material, that is not part of the assembly of components and is configured for assembly by a user with the assembly of components; and
providing for assembly of the battery with the assembly of components, wherein when the battery is assembled as a part of the assembly of components the radio frequency identification tag is positioned between the electrically conductive material of the battery and the electrically conductive element and for consequent disablement of the radio frequency identification tag.

13. A method as claimed in claim 12, further comprising providing for disassembly of the battery from the assembly of components and the consequent enablement of the radio frequency identification tag.

14. An apparatus comprising:
an assembly of components;
an additional component that is not part of the assembly of components and is configured for assembly by a user of the apparatus with the assembly of components; and
a radio frequency identification tag arranged to have operational characteristics that are automatically dependent upon whether the additional component is assembled as a part of the assembly of components,
wherein the apparatus has a first configuration in which the additional component is not part of the assembly of components, the apparatus is unusable by the user and the radio frequency identification tag has first operational characteristics and the apparatus has a second configuration in which the additional component is assembled as a part of the assembly of components, the apparatus is usable by the user and the radio frequency identification tag has second operational characteristics.

15. An apparatus as claimed in claim 14, wherein the first operational characteristics enable radio frequency identification of the apparatus via the radio frequency identification tag by a reader at a first distance and the second operational characteristics disable radio frequency identification of the apparatus via the radio frequency identification tag by the reader at the first distance.

16. An apparatus as claimed in claim 14, wherein the additional component is attachable and detachable from the assembly of components and wherein detachment of the additional component from the assembly of components converts the apparatus from the second configuration to the first configuration, and improves the performance of the radio frequency identification tag.

17. An apparatus as claimed in claim 14, wherein the additional component is configured to modify the operational characteristics of the radio frequency identification tag, when assembled as a part of the assembly of components, by interfering with the reception of radio frequency signals by the radio frequency identification tag.

18. An apparatus as claimed in claim 14, further comprising a switch that is actuated by the assembly of the additional component with the assembly of components and wherein actuation of the switch modifies the radio frequency identification tag.

19. A method comprising:
providing an assembly of components comprising a radio frequency identification tag and a switch;
providing a battery that is not part of the assembly of components and is configured for assembly by a user with the assembly of components; and
providing for assembly of the battery with the assembly of components, wherein the switch is configured to be actuated by the assembly of the battery with the assembly of components and is configured to cause the radio identification tag to be not fully operational.

20. A method as claimed in claim 19, further comprising providing for disassembly of the battery from the assembly of components and the consequent enablement of the radio frequency identification tag.

21. A method as claimed in claim 19, wherein the switch is a physical switch which moves to modify the radio frequency identification tag or an electrical switch, actuated by the battery, that modifies the radio frequency identification tag.

22. A method as claimed in claim 19, wherein the switch is an integral part of the radio frequency identification tag.

* * * * *